United States Patent Office.

WILLIAM R. CALL AND THADDEUS F. GRIFFIN, OF GLOUCESTER, MASSACHUSETTS.

Letters Patent No. 98,554, dated January 4, 1870.

IMPROVED MEDICAL COMPOUND.

The Schedule referred to in these Letters Patent and making part of the same.

*To all whom it may concern:*

Be it known that we, WILLIAM R. CALL and THADDEUS F. GRIFFIN, of Gloucester, in the county of Essex, and State of Massachusetts, have invented a new and valuable Improvement in Medical Compounds; and we do hereby declare that the following is a full, clear, and exact description of the same.

Our invention relates to medical compounds; and

It consists in a novel compound of medicinal herbs, intended to serve as a valuable remedy for diseases of the kidneys, and other ailments of the human body.

Our medicine is compounded as follows, namely;

We take of boneset, (thoroughwort,) and bistort, (knot-grass,) and spiræa, (queen of the meadow,) equal parts, by weight, and reduce them, by boiling in water, to a strong tincture. The preparation is then allowed to cool, and, after cooling, is placed in bottles, ready for use.

We claim, as our invention—

The combination of boneset, bistort, and spiræa, in the manner and proportions herein described, for the purposes specified.

In testimony that we claim the above, we have hereunto subscribed our names, in the presence of two witnesses.

WILLIAM R. CALL.
    THADDEUS F. GRIFFIN.

Witnesses:
    JAMES H. CLIFFORD,
    JOHN HODGKINS.